United States Patent
Decroos et al.

(10) Patent No.: US 8,992,110 B2
(45) Date of Patent: Mar. 31, 2015

(54) SPACER PLATE AND SUPPORT STRUCTURE

(75) Inventors: Marc Oscar Cornelius Decroos, Moorsele (BE); Tom Adriaan Gerard Dewaele, Kapellen (BE)

(73) Assignee: Barco N.V., Kortrijk (BE)

( * ) Notice: Subject to any disclaimer, the term of this patent is extended or adjusted under 35 U.S.C. 154(b) by 125 days.

(21) Appl. No.: 13/387,454

(22) PCT Filed: Jul. 27, 2010

(86) PCT No.: PCT/EP2010/004592
§ 371 (c)(1),
(2), (4) Date: Jan. 27, 2012

(87) PCT Pub. No.: WO2011/012286
PCT Pub. Date: Feb. 3, 2011

(65) Prior Publication Data
US 2012/0125870 A1    May 24, 2012

(30) Foreign Application Priority Data

Jul. 27, 2009   (GB) .................................. 0913026.1

(51) Int. Cl.
*F16B 7/00*   (2006.01)
*F16B 5/00*   (2006.01)
(Continued)

(52) U.S. Cl.
CPC .................. *F16B 5/0008* (2013.01); *A47F 5/10* (2013.01); *F16B 7/0406* (2013.01); *F16B 12/40* (2013.01); *A47B 47/027* (2013.01); *A47B 96/1466* (2013.01)
USPC ............ 403/292; 403/297; 403/300; 403/308

(58) Field of Classification Search
USPC .......... 52/845, 848, 849, 650.2, 656.8, 656.9; 403/DIG. 15, 292, 294, 297, 298, 301, 403/303, 306, 308, 336, 300
See application file for complete search history.

(56) References Cited

U.S. PATENT DOCUMENTS 4,009,550 A  *  3/1977  Young ........................... 405/251
4,032,244 A  *  6/1977  Quayle ......................... 403/286
(Continued)

FOREIGN PATENT DOCUMENTS

DE   202006018839 U1   3/2007
FR        2895467 A1   6/2007
(Continued)

OTHER PUBLICATIONS

International Preliminary Report on Patentablility for PCT/EP2010/004592, dated Aug. 3, 2001.
(Continued)

*Primary Examiner* — Daniel P Stodola
*Assistant Examiner* — Matthew R McMahon
(74) *Attorney, Agent, or Firm* — Bacon & Thomas, PLLC

(57) ABSTRACT

A spacer plate (3, 6, 7) for interconnecting support profiles (1, 5, 8, 9) of a display support structure (23) is described, including at least one alignment opening (11) for receiving an alignment stud (2) for aligning a first profile (1, 8) with respect to a second profile (5, 9) via the spacer plate (6), and at least one connector opening (13) for receiving a connector bar (4) for connecting the first profile (1, 8) to the second profile (5, 9) via the spacer plate (6), wherein the connector opening (13) is connected to the alignment opening (11) such that the relative position of the alignment stud (2) inside the alignment opening (11) is adjustable by the position of the connector bar (4) inside the connector opening (13). This allows to easily put the alignment stud (2) into the alignment opening (11) of the spacer plate (3, 6, 7) or vice versa and to eliminate all free play between the alignment stud (11) and the spacer plate (3, 6, 7) at the same time. The assembly of the support structure (23) is not hampered. At the same time a self centering of the alignment stud (2) with respect to the spacer plate (3, 6, 7) can be forced leading to an increased accuracy, when the profiles (1, 5, 8, 9) are connected to each other.

16 Claims, 4 Drawing Sheets

(51) Int. Cl.
*A47F 5/10* (2006.01)
*F16B 7/04* (2006.01)
*F16B 12/40* (2006.01)
*A47B 47/02* (2006.01)
*A47B 96/14* (2006.01)

(56) References Cited

U.S. PATENT DOCUMENTS

| | | | | |
|---|---|---|---|---|
| 4,071,990 | A | * | 2/1978 | Traber .............................. 52/155 |
| 4,570,408 | A | | 2/1986 | Frascaroli et al. |
| 5,065,558 | A | * | 11/1991 | Boatsman ........................ 52/239 |
| 5,481,842 | A | * | 1/1996 | Gautreau ..................... 52/656.9 |
| 5,651,630 | A | * | 7/1997 | Nomura ........................ 403/219 |
| 5,682,719 | A | * | 11/1997 | Huang ............................ 52/775 |
| 5,769,460 | A | * | 6/1998 | Imai ................................ 285/18 |
| 5,797,695 | A | * | 8/1998 | Prusmack ..................... 403/170 |
| 6,412,243 | B1 | * | 7/2002 | Sutelan ........................ 52/309.7 |
| 7,004,667 | B2 | * | 2/2006 | Ludwig et al. ................. 403/258 |
| 7,654,059 | B2 | * | 2/2010 | Hejnicki .......................... 52/750 |
| 7,731,247 | B2 | * | 6/2010 | Guzzoni ....................... 285/370 |

FOREIGN PATENT DOCUMENTS

GB 2313293 A * 11/1997
NL 1031445 C2 9/2007

OTHER PUBLICATIONS

International Search Report for PCT/EP2010/004592, dated Dec. 7, 2010.

* cited by examiner

SPACER PLATE AND SUPPORT STRUCTURE

FIELD OF THE INVENTION

The present invention relates to a spacer plate for interconnecting support profiles of a display support structure or the like as well as a display support structure for providing a fence and/or supporting a display or the like, e.g. including a spacer plate and a method of making a display support structure for providing a fence and/or supporting a display or the like, e.g. including a spacer plate.

BACKGROUND OF THE INVENTION

It is known to interconnect a plurality of profiles for providing a support structure like a fence or a display wall. The plurality of profiles can be connected to each other in an H-like manner easily. When the support structure is used as part of a display wall, it is important that particularly the profiles in mainly vertical direction are highly accurately aligned. If not, displays connected to profiles in mainly horizontal direction would not fit and/or would not look proper.

SUMMARY OF THE INVENTION

It is an object of the present invention to provide an alternative device and method by means of which profiles of a support structure can be connected. An advantage of embodiments of the present invention is that the device can be connected with high accuracy without hampering the assembly of the support structure.

The above objective is accomplished by a spacer plate as well as a support structure according to the present invention as indicated in the accompanying claims.

The spacer plate according to the invention for interconnecting support profiles of a display support structure, comprises at least one alignment opening for receiving an alignment stud for aligning a first profile with respect to a second profile via the spacer plate, and at least one connector opening for receiving a connector bar for connecting the first profile to the second profile via the spacer plate, wherein the connector opening is connected to the alignment opening such that the relative position of the alignment stud inside the alignment opening is adjustable by the position of the connector bar inside the connector opening.

By fastening the connector to the profiles, which have to be connected by the connector bar, the spacer plate can be moved relatively with respect to the alignment stud. Particularly, a force can be applied from the connector bar to the alignment stud via the spacer plate by fastening the connector bar to the profiles. This allows to put the alignment stud easily into the alignment opening of the spacer plate or vice versa and to reduce or eliminate all free play between the alignment stud and the spacer plate at the same time. The assembly of the support structure is not hampered. At the same time a self-centering of the alignment stud with respect to the spacer plate can be forced leading to an increased accuracy, when the profiles are connected to each others. Since all free play is substantially reduced or eliminated later during the assembly of the support structure all existing tolerances can be accommodated. For example, the effect of extrusion tolerances of the profiles, tolerances in position and diameter of openings and holes, tolerances of the alignment stud and so on can be substantially reduced eliminated. Due to the mainly plate-like design of the spacer plate a correct alignment of the spacer plate between a top surface of one profile and the bottom surface of another profile can be achieved. The spacer plate particularly comprises two, preferably three, four or more, alignment openings for inserting alignment studs in order to prevent a turning of one profile with respect to another profile. Particularly when two, preferably three, four connector or more, openings are provided, an unintentional turning of a profile can be prevented. Since the connector opening is connected to the alignment opening for instance by an appropriate cutout, the form of the alignment opening can be elastically deformed by the force applied by the connector bar. This allows clamping the alignment stud to the spacer plate. If so, the connection of the connector opening to the alignment opening can be designed such that the connector bar can come into contact to the alignment stud. Any further movement and/or a too hard fastening of the connector bar can be prevented. In addition the connection of two adjacent profiles by means of the connection bar and the additional stiffness provided by the spacer plate leads to an increased stability, so that the area close to the spacer plate is especially suitable for connecting a profile in perpendicular direction to the connected profiles. The profiles can particularly made from a light weight material, like aluminum and/or carbon fiber and/or plastics for instance PE, PP.

Particularly the alignment opening has a means for providing a spring force for clamping the alignment stud within the alignment opening. For example, the alignment opening can be connected to a particularly slot-like cut-out for providing the spring force for clamping the alignment stud within the alignment opening, wherein the cut-out is particularly arranged opposite to the connector opening. The cut-out provides an improved mobility of the edges of the alignment opening. The amount of elastic deformation can be increased and a higher spring force can be applied to an inserted alignment stud, by which the alignment stud can be clamped in place. Due to the cut-out a plastic deformation of the alignment opening can be prevented. A damage of the spacer material when the alignment opening is widened is prevented. A deformation of the spacer plate only within the plane of the spacer plate is safeguarded and a change of the gap between the connected profiles can be prevented.

Preferably, the alignment opening comprises a width in the spacer plate plane that differs from a length in the spacer plate plane, wherein the alignment opening is particularly at least partially elliptically-shaped and/or wedge-shaped. The alignment opening is preferably not circular but differs at least slightly from a circular cross section. This allows wedging the alignment stud into the alignment opening without play by fastening the connector bar to the first and second profile. Further, the force applied to the alignment stud can be focused to only few points. Due to this concentration of the applied force the self centering effect of the alignment studs even when press fitted into a corresponding alignment chamber is facilitated. The connector opening in the spacer plate for receiving the connector bar, e.g. a T-slot cutout in the spacer plate, preferably aligns with a similar shape in the profile, e.g. a T-slot feature in the profile.

In a further embodiment the design of the alignment opening and the connector opening is chosen such that in assembled state the connector bar can abut onto the alignment stud. The maximum movement of the connector bar can be limited by the alignment stud. This gives a clear feedback to the assembler of the support structure, that the fastening of the connector bar should be stopped. A too tough fastening is prevented. Also in this embodiment, the connector opening in the spacer plate for receiving the connector bar, e.g. a T-slot cutout in the spacer plate, can align with a similar shape in the profile, e.g. a T-slot feature in the profile.

In a preferred embodiment the connector opening is connected to the alignment opening via a constriction, wherein particularly the constriction is adapted to be widened by the connector bar. By means of the constriction a connector bar comprising a wedge-like and/or trapezoid cross section can widen the constriction and thus widen the alignment opening particularly for clamping the alignment stud within the alignment opening. Further, between the alignment opening and the connector opening a continuous cut-out can be provided. The alignment opening, the connector opening and the constriction can be provided by one cut-out, particularly by stamping.

Particularly, a first pair of alignment openings for connecting two adjacent profiles and a second pair of alignment openings for connecting two adjacent profiles are provided, wherein the distance between the alignment openings of the first pair differs from the distance between the alignment openings of the second pair. By means of each pair of alignment openings two neighboring profiles, which may be arranged adjacent in mainly horizontal direction, can be connected. Due to the different distances, a defined angle between the neighboring profiles can be provided. The support structure can be arranged so that it extends not only linearly but also angled. For instance the support structure can follow the boundaries of a sports ground or soccer field.

The invention further relates to a support structure particularly for providing a fence and/or supporting a display, comprising a first profile connected to a second profile via a spacer plate, wherein the first profile is aligned with respect to the second profile by means of at least one alignment stud and the first profile is fastened to the second profile by at least one connector bar, wherein the spacer plate is designed such, that the connector bar presses the spacer plate towards the alignment stud. The spacer plate can be designed as previously described. This allows to easily put the alignment stud into the alignment opening of the spacer plate or vice versa but to reduce or eliminate all free play between the alignment stud and the spacer plate. The assembly of the support structure is not hampered. Since the connector bar presses the spacer plate to the alignment stud a self centering of the alignment stud with respect to the spacer plate can be forced at the same time leading to an increased accuracy, when the profiles are connected to each other. The provided support structure which particularly comprises a plurality of mainly vertical and horizontal profiles is highly accurately aligned. When the support structure is used as part of a display wall, displays connected to profiles in mainly horizontal direction would fit and/or look correct, as result of a controlled and accurate gap between the display elements (screens) provided by the present invention.

Preferably, the alignment stud comprises a flange for abutting on the spacer plate inside the alignment opening, wherein particularly the thickness of the flange is smaller than the thickness of the spacer plate. Via the edge of the flange a force provided by the fastened connector bar can be applied to the alignment stud for self centering the alignment stud. Since the flange is thinner than the spacer plate thickness, tolerances of the flange do not lead to a different gap between connected profiles. Further, the radius where the force for the self centering effect applies can be increased by the flange without an increase of material in the same amount. Due to the increased radius, the accuracy of the self centering effect for the alignment stud is increased.

Particularly, the connector bar comprises a first screw hole for connecting the connector bar to a first profile hole of the first profile and a second screw hole for connecting the connector bar to a second profile hole of the second profile, wherein the distance between the first screw hole and the second screw hole is smaller than the distance between the first profile hole and the second profile hole, wherein the first screw hole only partially overlaps the first profile hole and/or the second screw hole only partially overlaps the second profile hole. Due to the smaller distance of the screw holes with respect to the distance of the profile holes, the first profile and the second profile are pressed together when the connector bar is fastened to the first profile and the second profile. Free play between the first profile and the second profile can be eliminated. Since the screw holes and the profile holes at least partially overlap, it can be safeguarded, that the tip of a screw or other fastening means can be inserted into both the screw hole and the profile hole. This allows applying a force to the first profile and the second profile for pressing both profiles towards each other.

Particularly, the connector bar is fastened to the profiles by at least one set screw, e.g. a socket set screw with cone point; optionally a hexagonal socket set screw with cone point. By using a set screw, e.g. a hexagonal socket set screw, it is possible that no screw head protrudes from a profile leading to a smooth look and an even outer surface of the support structure. By means of the cone point the screw can be easily inserted into a hole with or without a female screw thread. The connector bar particularly comprises at least one screw hole with a female screw thread for receiving the set screw, e.g. the hexagonal socket set screw with cone point.

Preferably the first profile and/or the second profile comprise at least one T-slot for receiving the connector bar. The connector bar can be preferably arranged completely inside the T-slot so that the connector bar does not protrude from the profiles. This leads to a smooth look and an even outer surface of the support structure. Particularly, the connector bar can get additional support within the T-slot, when the connector bar is fastened and applies additional forces to the spacer plate. It can be prevented that the connector bar can be bent or plastically deformed.

Particularly, the first profile comprises a top plane surface opposite to a bottom plane surface of the second profile, wherein the first profile comprises at the top plane surface at least one first alignment chamber for receiving the alignment stud particularly in a press fitted manner and the second profile comprises at the bottom plane surface at least one second alignment chamber for receiving the alignment stud particularly in a press fitted manner. The alignment stud can be connected to both the first profile and the second profile in press fitted manner without play. An inclined alignment of the alignment stud can be prevented, by the pressure applied to the alignment stud from the connector bar via the spacer plate. A secure and accurate connection at the same time can be provided.

Preferably, the first profile and the second profile are identically shaped. The support structure can be provided as modular construction system with a low number of different parts. Further, the plurality of profiles can be cut from a longer particularly endless profile at a predefined length.

Particularly, a first set of a connected first profile and second profile is connected to a second set of a connected first profile and second profile via the spacer plate or via a connector profile, wherein the connector profile is particularly adapted to support a display connected to the connector profile. One spacer plate can be used for connecting the first set of profiles as well as the second set of profiles. The distance between the first set and the second set can be defined by means of the design of the spacer plate. Due to the forced self centering effect of the alignment studs, the neighboring set of profiles can be arranged very close to each other without the risk that neighboring profiles interfere with each other. An even look of connected displays can be safeguarded.

Figure 1:
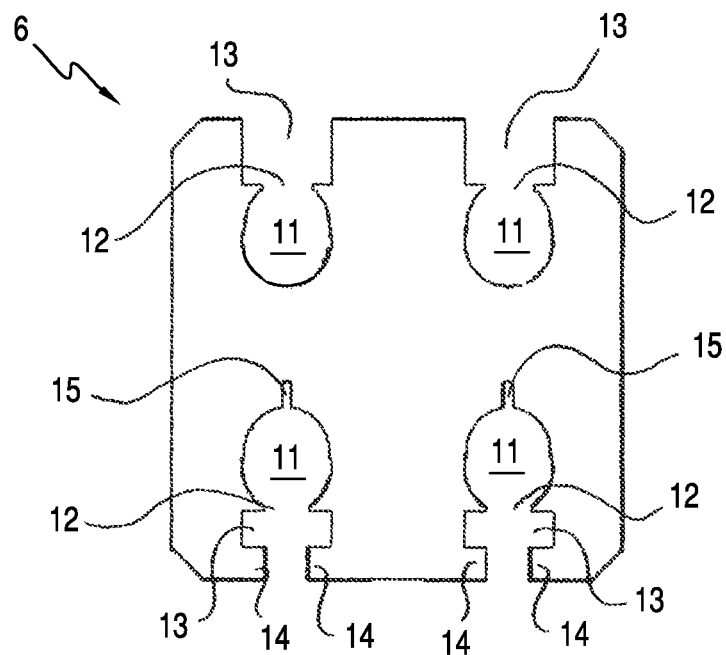
FIG. 1 is a schematic top view of a spacer plate.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the sum of the technical teaching of the invention, the invention being limited only by the terms of the appended claims.

The embodiment of the spacer plate 6 as illustrated in FIG. 1 comprises a number of, e.g. four alignment openings 11 each for receiving one alignment stud 2. Each alignment opening 11 is connected via a restriction 12 to a connector opening 13 for receiving a connector bar 4. By means of lugs 14 the connector bar 4 can be held inside the connector opening 13. Further, the connector bar 4 can be pressed against the lugs 14. The form of the alignment openings 11 is preferably not circular but can be mainly elliptic, for example, so that alignment stud 2 of a mainly circular cross section can be clamped onto the edges of the alignment opening 11. Means are provided for facilitating the provision of a sufficient spring force of the alignment opening 11 onto the alignment stud 2, e.g. a mainly slot-like cut-out 15 is provided. The cut-out 15 is connected to the alignment opening 11 and arranged opposite to the restriction 12 and the connector opening 13.

Figure 2:
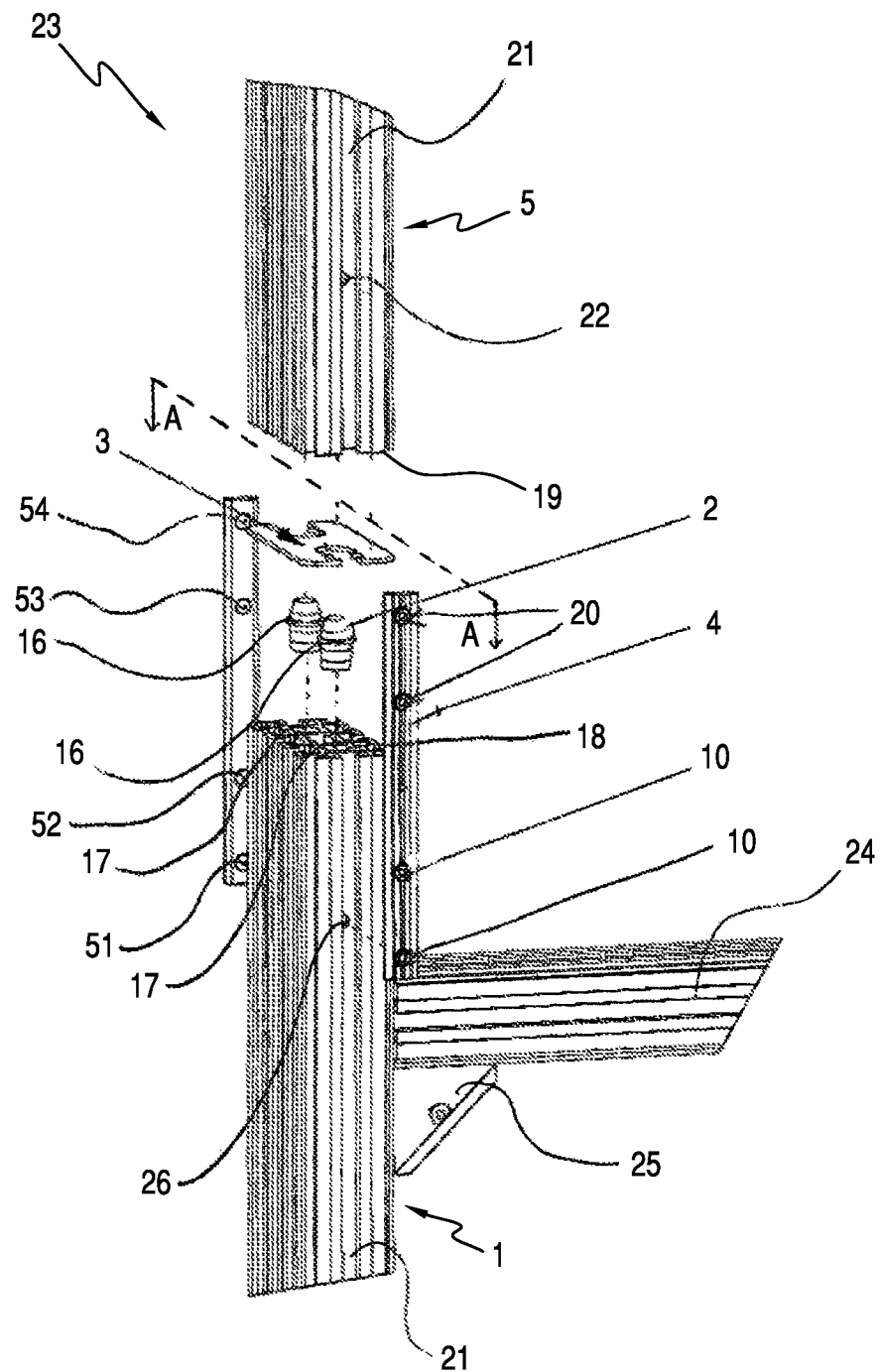
FIG. 2 is a schematic exploded view of a support structure with the spacer plate of FIG. 1.

As illustrated in FIG. 2 a spacer plate 3 with two alignment openings 11 is sufficient for connecting a lower first profile 1 to an upper second profile 5. The alignment studs 2 each comprise a means for limiting the insertion depth, e.g. they have a flange 16 which is arranged in the plane of the spacer plate 3 in assembled state. The alignment studs 2 can be inserted into corresponding alignment chambers 17, e.g. in a press fitted manner at a top plane 18 of the lower first profile 1 and at a bottom plane 19 of the upper second profile 5. Due to the flange 16 of the alignment studs 2 it is prevented to insert the alignment studs 2 too deeply into the alignment chambers 17.

In the embodiment illustrated in FIG. 2 the connector bar 4 comprises two first screw holes 10 and two second screw holes 20 each with an internal thread, by which socket screws S1, S2, S3, S4 can be received. The connector bar 4 is shaped for being received by a correspondingly shaped slot in the first profile 1 and the second profile 5, e.g. in a T-slot 21 of the first profile 1 and the second profile 5. The first profile 1 comprises a first profile hole 26 by which the socket screw S1 of the lower first screw hole 10 can be received. This prevents that the connector bar 4 may fall downwards along the T-slot 21. The second profile 5 comprises a second profile hole 22, into which the socket screw S4 of the upper second screw hole 20 can be inserted. The socket screws S2, S3 cannot be inserted into a hole of the profile 1, 5 but can be pressed against the respective profile 1, 5. By screwing the socket screw S2, S3 in, the connector bar 4 can be pressed outwards against the outer lugs of the T-slot 21.

After the connection of the first profile 1 with the second profile 5 a support structure 23 is given. Several sets of mainly vertical connected profiles 1, 5 can be arranged spaced to each other and connected to each other by means of mainly horizontal arranged connector profiles 24. The connector profiles 24 can be connected to the profiles 1, 5 via a bracket 25 which can be connected with slots, e.g. T-slots 21 of the profile 1, 5 and of the connector profile 24. The connecter profiles 25 can be used for connecting a not illustrated display or the like to the connector profile 25.

Figure 3:
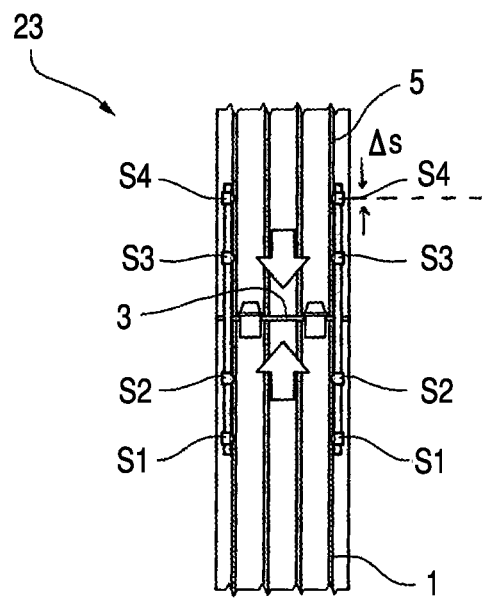
FIG. 3 is a schematic sectional view of the support structure of FIG. 2 taken along line I-I, when the support structure is in the assembled state.

As illustrated in FIG. 3 the distance between the first profile hole 26 and the second profile hole 22 and the distance between the respective first screw hole 10 and the second screw hole 20 differ by a distance Δs. When the socket screw S4 is partially screwed in, the upper second profile 5 is pressed downwards and the lower first profile 1 is pressed upwards eliminating any play in vertical direction.

Figure 4:
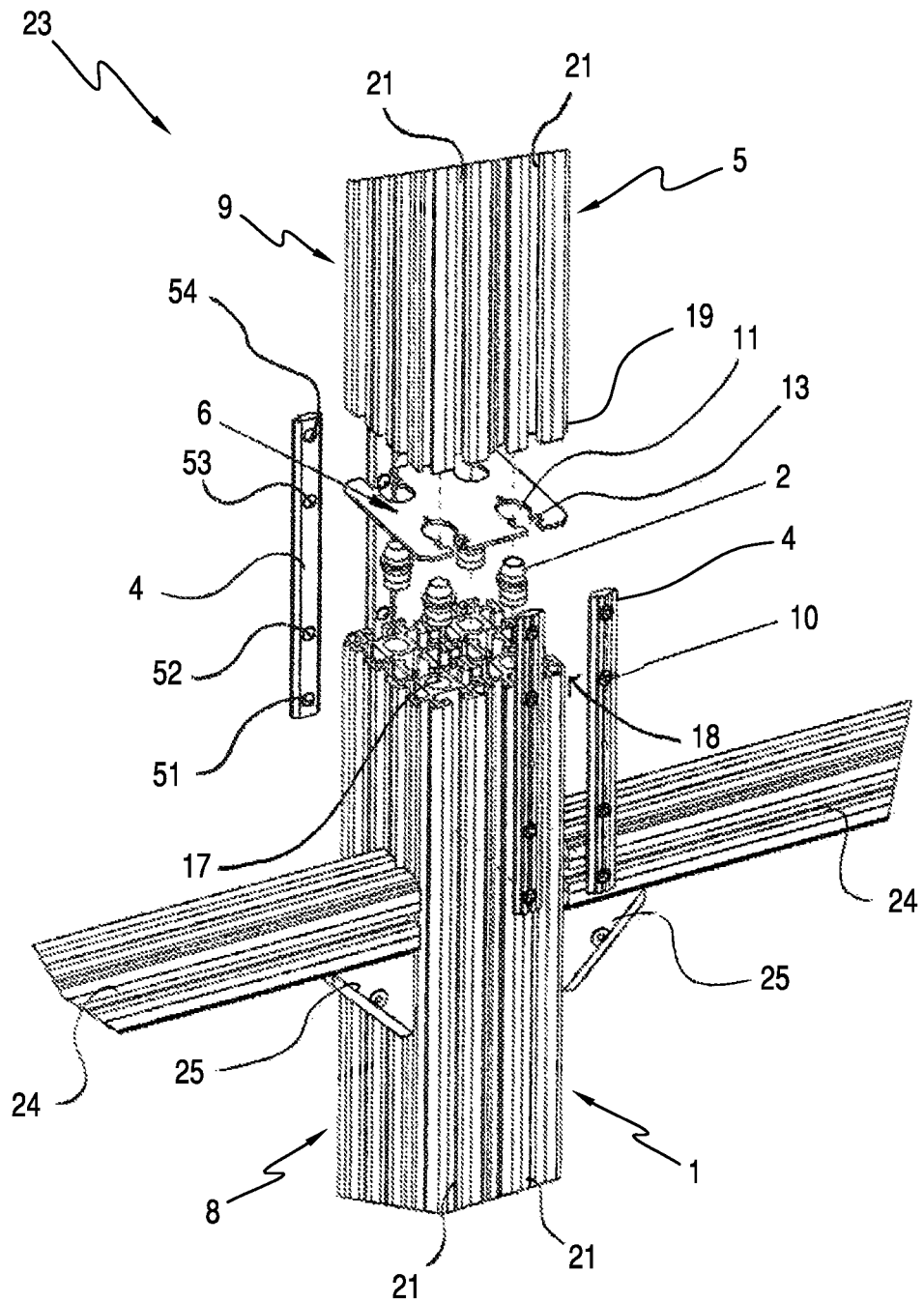
FIG. 4 is a schematic exploded view of the support structure of FIG. 3, when two neighbouring set of profiles are connected.

As illustrated in FIG. 4 the connection technique explained with respect to FIG. 2 can also be applied for connecting two neighbouring sets of connected profiles 1, 5; 8,9. For this purpose one spacer plate 6 as illustrated in FIG. 1 can be used for clamping all applied alignment studs 2.

Figure 5:
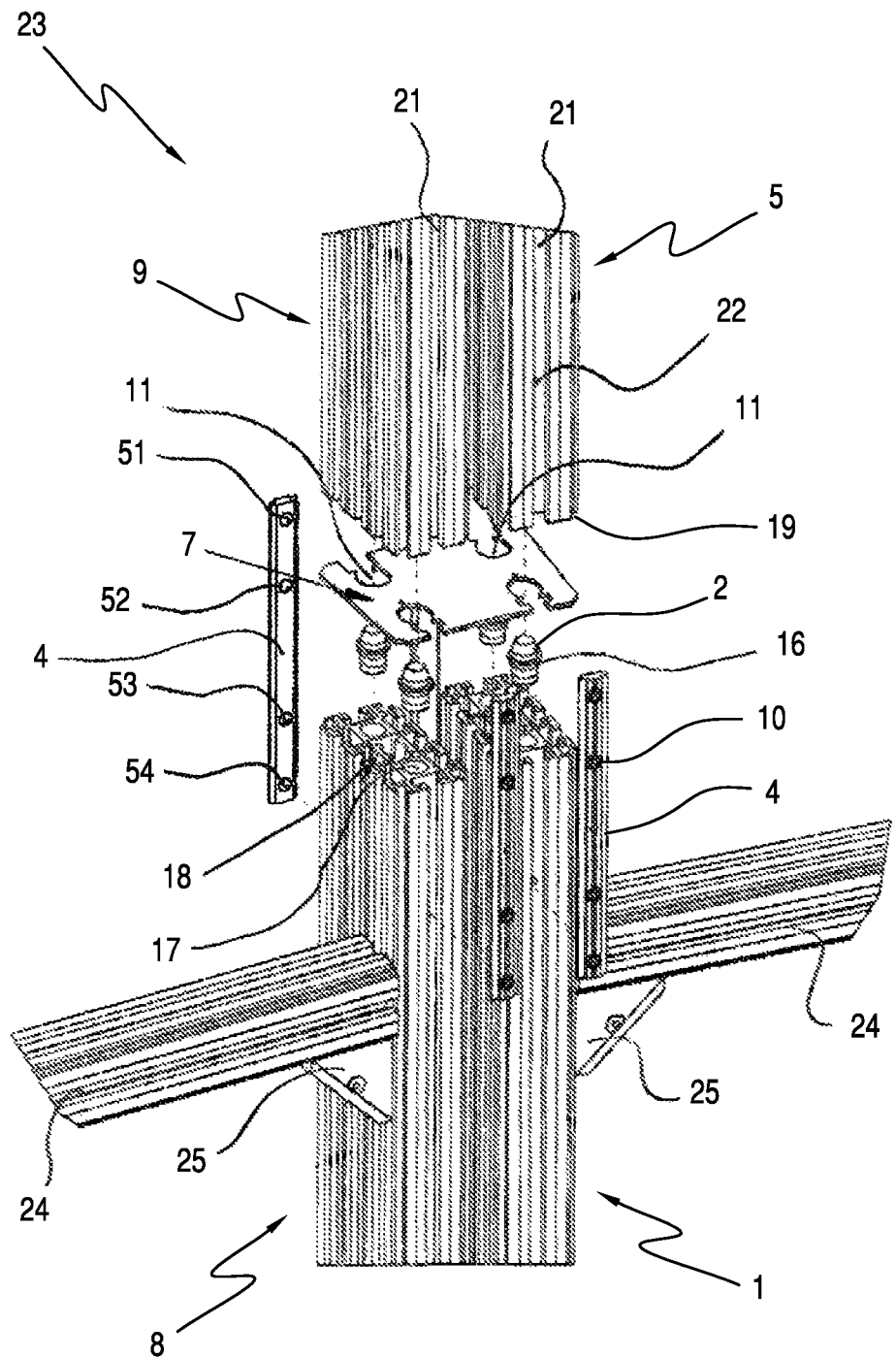
FIG. 5 is a schematic exploded view of the support structure of FIG. 4 when two neighbouring set of profiles are connected via an angle.

In the embodiment illustrated in FIG. 5 it is possible to connect two neighbouring sets of profiles 1, 5; 8, 9 via an angle. The angle is provided by a spacer plate 7. The distance of a pair of alignment openings 11 at the rear side is greater than the distance of a pair of alignment openings at the front side. Due to the different distances of the alignment openings 11 a more curved and/or angled structure of the support structure 23 can be provided.

The invention claimed is:

1. A support structure for providing a fence and/or supporting a display comprising:
    at least two profiles, said at least two profiles being a first profile and a second profile;
    a connector bar for fastening the first profile to the second profile;
    a spacer plate configured to connect said at least two profiles; and
    at least one alignment stud for aligning the first profile with respect to the second profile via the spacer plate, wherein the spacer plate comprises:
    at least one alignment opening for receiving the alignment stud,
    at least one connector opening for receiving the connector bar, wherein said connector bar is arranged for pressing the spacer plate towards the alignment stud, and wherein the connector opening communicates with the alignment opening such that the relative position of the alignment stud inside the alignment opening is adjustable by the position of the connector bar inside the connector opening by pressing the spacer plate towards the alignment stud, the alignment opening being connected to an element providing a spring force for clamping the alignment stud within the alignment opening.

2. The support structure according to claim 1, wherein the element providing a spring force is a slot-like cut-out, wherein the cut-out is particularly arranged opposite to the connector opening.

3. The support structure according to claim 1, wherein the alignment opening has a width in a spacer plate plane differing from a length in the spacer plate plane, wherein the alignment opening is particularly at least partially elliptic-shaped and/or wedge-shaped.

4. The support structure according to claim 1, wherein the alignment opening and the connector opening are arranged for abutting the connector bar on the alignment stud in an assembled state.

5. The support structure according to claim 1, wherein the connector opening is connected to the alignment opening via a constriction, and wherein the constriction is arranged to be widened by the connector bar.

6. The support structure according to claim 1, wherein a first pair of alignment openings for connecting two adjacent profiles and a second pair of alignment openings for connecting two adjacent profiles are provided in the spacer plate, and wherein the distance between the alignment openings of the first pair differs from the distance between the alignment openings of the second pair.

7. The support structure according to claim 1, wherein the alignment stud comprises a flange for abutting on the spacer plate inside the alignment opening, and wherein the thickness of the flange is smaller than the thickness of the spacer plate.

8. The support structure according to claim 1, wherein the connector bar comprises a first screw hole for connecting the connector bar to a first profile hole of the first profile and a second screw hole for connecting the connector bar to a second profile hole of the second profile, wherein the distance between the first screw hole and the second screw hole is smaller than the distance between the first profile hole and the second profile hole, and wherein the first screw hole only partially overlaps the first profile hole and/or the second screw hole only partially overlaps the second profile hole.

9. The support structure according to claim 1, wherein the first profile and/or the second profile comprise at least one slot for receiving the connector bar.

10. The support structure according to claim 1, wherein the first profile comprises a top plane opposite to a bottom plane of the second profile, wherein the first profile comprises at the top plane at least one first alignment chamber for receiving a first alignment stud in a press fitted manner and the second profile comprises at the bottom plane at least one second alignment chamber for receiving a second alignment stud in a press fitted manner.

11. The support structure according to claim 10, wherein the first or second alignment stud has a means arranged in the plane of the spacer plate in an assembled state for restricting the depth that the first or second alignment stud can enter the first or second alignment chamber, respectively.

12. The support structure according to claim 1, wherein the first profile and the second profile are identically shaped.

13. The support structure according to claim 1, wherein a first set of a connected first profile and second profile is connected to a second set of a connected first profile and second profile via the spacer plate or via a connector profile, wherein the connector profile is particularly adapted to support a display connected to the connector profile.

14. A support structure for providing a fence and/or supporting a display comprising:
- at least two profiles, said at least two profiles being a first profile and a second profile;
- a connector bar for fastening the first profile to the second profile;
- a spacer plate configured to connect said at least two profiles; and
- at least one alignment stud for aligning the first profile with respect to the second profile via the spacer plate, wherein the spacer plate comprises:
- at least one alignment opening for receiving the alignment stud,
- at least one connector opening for receiving the connector bar, wherein said connector bar is arranged for pressing the spacer plate towards the alignment stud, and
- wherein the connector opening communicates with the alignment opening such that the relative position of the alignment stud inside the alignment opening is adjustable by the position of the connector bar inside the connector opening by pressing the spacer plate towards the alignment stud, the alignment opening having a width in a spacer plate plane differing from a length in the spacer plate plane and being particularly at least partially elliptic-shaped and/or wedge-shaped.

15. A support structure for providing a fence and/or supporting a display comprising:
- at least two profiles, said at least two profiles being a first profile and a second profile;
- a connector bar for fastening the first profile to the second profile;
- a spacer plate configured to connect said at least two profiles; and
- at least one alignment stud for aligning the first profile with respect to the second profile via the spacer plate, wherein the spacer plate comprises:
- at least one alignment opening for receiving the alignment stud,
- at least one connector opening for receiving the connector bar, wherein said connector bar is arranged for pressing the spacer plate towards the alignment stud, and
- wherein the connector opening communicates with the alignment opening such that the relative position of the alignment stud inside the alignment opening is adjustable by the position of the connector bar inside the connector opening by pressing the spacer plate towards the alignment stud, the connector opening being connected to the alignment opening via a constriction, and the constriction being arranged to be widened by the connector bar.

16. A support structure for providing a fence and/or supporting a display comprising:
- at least two profiles, said at least two profiles being a first profile and a second profile;
- a connector bar for fastening the first profile to the second profile;
- a spacer plate configured to connect said at least two profiles; and
- at least one alignment stud for aligning the first profile with respect to the second profile via the spacer plate, wherein the spacer plate comprises:
- at least one alignment opening for receiving the alignment stud,
- at least one connector opening for receiving the connector bar, wherein said connector bar is arranged for pressing the spacer plate towards the alignment stud, and
- wherein the connector opening communicates with the alignment opening such that the relative position of the alignment stud inside the alignment opening is adjustable by the position of the connector bar inside the connector opening by pressing the spacer plate towards the alignment stud, a first pair of alignment openings for connecting two adjacent profiles and a second pair of alignment openings for connecting two adjacent profiles being provided in the spacer plate, and the distance between the alignment openings of the first pair differing from the distance between the alignment openings of the second pair.

* * * * *